US010577482B2

(12) United States Patent
Talreja et al.

(10) Patent No.: US 10,577,482 B2
(45) Date of Patent: *Mar. 3, 2020

(54) PEROXIDE-CROSSLINKABLE COMPOSITIONS AND PROCESSES FOR THEIR MANUFACTURE

(71) Applicant: Dow Global Technologies LLC, Midland, MI (US)

(72) Inventors: Manish Talreja, Lansdale, PA (US); Jeffrey M. Cogen, Flemington, NJ (US); Gerrit Groot-Enzerink, Gross (CH); Timothy J. Person, Pottstown, PA (US); Neil W. Dunchus, Kinnelon, NJ (US); Gary W. Buckler, Victoria, TX (US); Gabriele Goethel, Merseburg (DE); Saurav S. Sengupta, Collegeville, PA (US); Antoni Adamczyk, Piscataway, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,331

(22) Filed: Oct. 11, 2018

(65) Prior Publication Data

US 2019/0040231 A1 Feb. 7, 2019

Related U.S. Application Data

(63) Continuation of application No. 15/662,876, filed on Jul. 28, 2017, now Pat. No. 10,221,299, which is a continuation of application No. 14/917,645, filed as application No. PCT/US2014/054526 on Sep. 8, 2014, now Pat. No. 9,745,447.

(60) Provisional application No. 61/877,405, filed on Sep. 13, 2013.

(51) Int. Cl.
*C08K 5/372* (2006.01)
*C08K 5/00* (2006.01)
*C08K 5/3492* (2006.01)
*H01B 13/14* (2006.01)
*H01B 3/30* (2006.01)
*C08K 5/14* (2006.01)
*C08K 5/3435* (2006.01)
*C08K 5/34* (2006.01)

(52) U.S. Cl.
CPC .............. *C08K 5/372* (2013.01); *C08K 5/005* (2013.01); *C08K 5/14* (2013.01); *C08K 5/3435* (2013.01); *C08K 5/34924* (2013.01); *H01B 3/308* (2013.01); *H01B 13/148* (2013.01); *C08K 5/34* (2013.01)

(58) Field of Classification Search
CPC ......... C08K 5/372; C08K 5/3435; C08K 5/34
USPC ........................................................ 524/102
See application file for complete search history.

(56) References Cited

U.S. PATENT DOCUMENTS

| 4,101,445 | A | 7/1978 | Levine et al. |
| 4,144,202 | A | 3/1979 | Ashcraft et al. |
| 4,302,565 | A | 11/1981 | Goeke et al. |
| 4,508,842 | A | 4/1985 | Beran et al. |
| 4,578,410 | A | 3/1986 | Takahashi et al. |
| 4,832,882 | A | 5/1989 | Moylan |
| 4,937,299 | A | 6/1990 | Ewen et al. |
| 5,246,783 | A | 9/1993 | Spenadel et al. |
| 5,272,236 | A | 12/1993 | Lai et al. |
| 5,278,272 | A | 1/1994 | Lai et al. |
| 5,317,036 | A | 5/1994 | Brady, III et al. |
| 5,332,793 | A | 7/1994 | Cann |
| 5,342,907 | A | 8/1994 | Cann et al. |
| 5,371,145 | A | 12/1994 | Daniell et al. |
| 5,405,901 | A | 4/1995 | Daniell et al. |
| 5,410,003 | A | 4/1995 | Bai |
| 6,187,847 | B1 | 2/2001 | Cogen et al. |
| 6,187,858 | B1 * | 2/2001 | Tachikawa ........... C08K 5/1345 428/377 |
| 6,232,376 | B1 | 5/2001 | Tsukada et al. |
| 6,496,629 | B2 | 12/2002 | Ma et al. |
| 6,656,986 | B2 | 12/2003 | Caronia et al. |
| 6,714,707 | B2 | 3/2004 | Rossi et al. |
| 6,878,761 | B2 | 4/2005 | Gugumus |
| 8,455,580 | B2 | 6/2013 | Sengupta et al. |
| 9,757,888 | B2 | 9/2017 | Kuroda et al. |
| 2002/0169238 | A1 * | 11/2002 | Caronia ................... C08K 5/14 524/100 |
| 2006/0116456 | A1 | 6/2006 | Lin et al. |
| 2013/0210945 | A1 | 8/2013 | Picot et al. |

FOREIGN PATENT DOCUMENTS

| EP | 0870803 A1 | 10/1998 |
| EP | 1243614 A1 | 9/2002 |
| JP | 56106943 | * 8/1981 |

(Continued)

OTHER PUBLICATIONS

Data sheets of Cyasorb 3529, 2014. (Year: 2014).*
Translation of JP 56-106943, Aug. 25, 1981. (Year: 1981).

*Primary Examiner* — Hui H Chin
(74) *Attorney, Agent, or Firm* — Husch Blackwell LLP

(57) ABSTRACT

A peroxide-crosslinkable composition comprising:
(A) A peroxide-crosslinkable polymer, e.g., a polyethylene;
(B) A nitrogenous base, e.g., a low molecular weight, or low melting, or liquid nitrogenous base such as triallyl cyanurate (TAC); and
(C) One or more antioxidants (AO), e.g., distearylthiodipropionate (DSTDP).

The composition is useful in the manufacture of insulation sheaths for high and extra high voltage wire and cable.

11 Claims, 2 Drawing Sheets

(56) References Cited

FOREIGN PATENT DOCUMENTS

| | | |
|---|---|---|
| JP | S56-106943 A | 8/1981 |
| JP | 2002-083516 A | 3/2002 |
| JP | 2005187595 A | 7/2005 |
| JP | 2011258520 A | 12/2011 |
| JP | 2012204044 A | 10/2012 |
| JP | 2013-035937 A | 2/2013 |
| WO | 99/21194 A1 | 4/1999 |
| WO | 2001/032393 A2 | 12/2001 |

* cited by examiner

PEROXIDE-CROSSLINKABLE COMPOSITIONS AND PROCESSES FOR THEIR MANUFACTURE

FIELD OF THE INVENTION

The invention relates to peroxide-crosslinkable compositions. In one aspect, the invention relates to processes of preparing peroxide-crosslinkable compositions while in another aspect, the invention relates to insulation made from the compositions that is useful in the manufacture of high voltage (HV) or extra high voltage (EHV) power cable.

BACKGROUND OF THE INVENTION

U.S. Pat. No. 6,656,986 teaches various polyethylene, peroxide-crosslinkable compositions useful in the manufacture of power cable insulation. Some of these compositions have achieved commercial success in the medium voltage power cable market, and an interest exists in extending these commercially successful compositions into the high and extra high voltage power cable markets.

The manufacture of power cable insulation is a multistep process that can be separated into two broad parts, i.e., first making a composition from which the cable insulation is made, and second, extruding the composition over single or stranded conductor as an insulation.

In one embodiment of the first part of the process, i.e., the part in which the composition is made, a base polymer, e.g., polyethylene, is mixed with one or more additives and then formed into pellets which are soaked with peroxide and subsequently stored and/or shipped to a fabricator who performs the second part of the process, i.e., converting the pellets to a wire or cable coating. To avoid acid catalyzed decomposition of peroxide during storage and shipping, U.S. Pat. No. 6,656,986 teaches inclusion of oligomeric and/or high molecular weight hindered amine stabilizers (HAS).

In the making of the pellets, care is taken not to introduce or create impurities that can adversely affect the utility of the composition once formed into a wire or cable sheath. However, some impurities are inevitably introduced into the composition either as, for example, contaminants associated with feed materials to the process, or are made during the process as, for example, gels that result from degradation of the base polymer. Efforts are made, of course, to minimize and remove these impurities before the composition is extruded as a power cable sheath. Some of the impurities are in the form of fine, e.g., less than 100 microns ($\mu m$), particulates and are susceptible to removal from the composition by filtering. In those embodiments in which the composition is compounded within an extruder, a fine-mesh screen is typically located at or near the die head of the extruder such that the melt within the extruder must pass through the screen before it leaves the extruder. As the filter becomes plugged with particulates, pressure builds within the extruder and the operational efficiency of the extruder drops until the filter is cleansed or replaced. In those embodiments in which an oligomeric or high molecular weight base, e.g., a oligomeric or high molecular weight HAS, is present in the composition prior to melt filtration, it tends to contribute to the plugging of the screen and diminishing the operational efficiency of the extruder and overall run efficiency of the process.

Insulation for use in medium voltage power cable applications can typically tolerate more impurities than those for use in high or extra high voltage power cable applications. As such, the screen used to filter the composition before extrusion into pellets can be more coarse, i.e., have a larger openings, than that used for filtering compositions for use in high or extra high voltage power cable applications. As a consequence and all else being equal, the finer (smaller) the screen mesh through which a melt must pass, the more particulate it will trap, the faster it will plug, and the shorter the time interval will be between filter cleaning and/or replacement. This, in turn, affects the operational efficiency of the compounding process.

Of particular interest to the extension of compositions currently designed for use in medium voltage power cable applications to high and extra high voltage power cable applications is the reduction and/or elimination of particulate contaminants and gels during the compounding of the base polymer with additives and/or fillers and to the extent that such gels are made, their removal by filtering before the composition is fabricated into pellets. Further to this interest is maintaining the relative stability of the pellet against loss of crosslinking efficiency during shipping and/or storage, and the minimizing of water generation during cure.

SUMMARY OF THE INVENTION

In one embodiment the invention is an additive pre-blend composition comprising or consisting essentially of 0.6 to 66 weight percent triallyl cyanurate (TAC) and 34 to 99.4 wt % of an antioxidant (AO). In one embodiment the invention is an additive pre-blend composition comprising or consisting essentially of TAC and AO at a TAC:AO weight ratio of 1:100 to 3:2.

In one embodiment the invention is a peroxide-crosslinkable composition comprising:
(A) A peroxide-crosslinkable polymer;
(B) A peroxide;
(C) Triallyl cyanurate (TAC); and
(D) One or more antioxidants (AO),
the TAC and AO present at a TAC:AO weight ratio of 1:100 to 3:2 wherein TAC is present at less than (<) 0.01% in the final formulation. In one embodiment the composition is in the form of a pellet.

In one embodiment the invention is a process for making a peroxide-crosslinkable pellet, the process comprising the steps of:
(1) Forming a homogeneous melt of a:
 (A) Peroxide-crosslinkable polymer; and
 (B) Pre-blend of triallyl cyanurate (TAC) and AO, the pre-blend comprising or consisting essentially of 0.6 to 66 wt % TAC and 34 to 99.4 wt % of AO;
(2) Passing the homogeneous melt of (1) through a filter with a mesh size of less than 100 $\mu m$; and
(3) Forming pellets from the filtered homogeneous melt of (2).

In a further step, the pellets are impregnated with a peroxide, typically by spraying or otherwise applying a liquid peroxide to the pellets and allowing the pellets to absorb the peroxide. In one embodiment the peroxide is mixed with an organic nitrogenous base, e.g., TAC, before the peroxide is applied to the pellets.

In one embodiment the invention is a peroxide-crosslinkable composition comprising:
(A) A peroxide-crosslinkable polymer;
(B) A low molecular weight, or low melting, or liquid nitrogenous base at 0.0005% to 0.01%;
(C) One or more antioxidants (AO); and
(D) Optionally, a peroxide.

In one embodiment the base comprises TAC. In one embodiment the base comprises N,N'-1,6-hexanediylbis(N-(2,2,6,6-tetramethyl-4-piperidinyl)-formamide (UVINUL™ 4050 from BASF) and/or TINUVIN™ 765 (mixture of bis(1,2,2,6,6-pentamethyl-4-piperidyl)sebacate and methyl 1,2,2,6,6-pentamethyl-4-piperidyl sebacate). In one embodiment the antioxidant contains sulfur, e.g., distearylthiodipropionate (DSTDP).

In one embodiment the invention is a process for making a peroxide-crosslinkable pellet, the process comprising the steps of:
(1) Forming a homogeneous melt of:
  (A) A peroxide-crosslinkable polymer;
  (B) A low molecular weight, or liquid, or low melting nitrogenous base at 0.0005% to 0.01%, and
  (C) Optionally, an antioxidant (AO);
(2) Passing the homogeneous melt of (1) through a filter with a mesh size of less than 100 μm; and
(3) Forming pellets from the filtered homogeneous melt of (2).

In a further step, the pellets are impregnated with a peroxide, typically by spraying or otherwise applying a liquid peroxide to the pellets and allowing the pellets to absorb the peroxide. In one embodiment the peroxide is mixed with an organic nitrogenous base, e.g., TAC, before the peroxide is applied to the pellets.

In one embodiment the invention is a process for making a peroxide-crosslinkable pellet, the process comprising the steps of:
(1) Forming a melt of a peroxide-crosslinkable polymer with AO;
(2) Passing the melt of (1) through a filter with a mesh size of less than 100 μm;
(3) Forming pellets from the filtered homogeneous melt of (2); and
(4) Impregnating the pellets with a low molecular weight, or liquid nitrogenous base.

In one embodiment the pellets are also impregnated with a peroxide.

In one embodiment the invention is a wire or cable comprising a sheath made from the pellets of any of the embodiments described above. In one embodiment the wire or cable is a high voltage or extra-high voltage wire or cable.

DETAILED DESCRIPTION OF THE PREFERRED EMBODIMENT

Definitions

Figure 1:
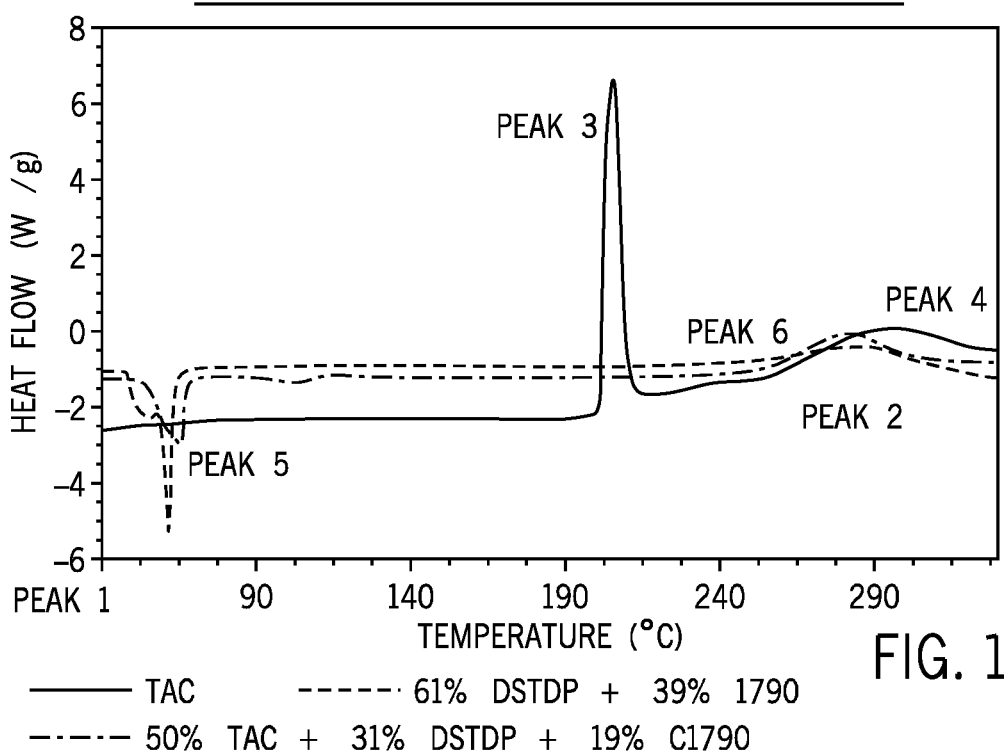
FIG. 1 is a chart reporting the thermograms for the Inventive Example 1 TAC, AO mixture, and pre-blend of TAC and the AO mixture at a 1:1 weight ratio.

For purposes of U.S. patent practice, all patents, patent applications and other cited documents within this application are incorporated in their entirety herein by reference to the extent that they are not in conflict with the disclosure of this application.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of a particular component in a composition.

"Comprising", "including", "having" and like terms mean that the composition, process, etc. is not limited to the components, steps, etc. disclosed, but rather can include other, undisclosed components, steps, etc. In contrast, the term "consisting essentially of" excludes from the scope of any composition, process, etc. any other component, step etc. excepting those that are not essential to the performance, operability or the like of the composition, process, etc. The term "consisting of" excludes from a composition, process, etc., any component, step, etc. not specifically disclosed. The term "or", unless stated otherwise, refers to the disclosed members individually as well as in any combination.

"Wire" and like terms mean a single strand of conductive metal, e.g., copper or aluminum, or a single strand of optical fiber.

"Cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium, high and extra high voltage applications. Low voltage cables are designed to carry less than 3 kilovolts (kV) of electricity, medium voltage cables 3 to 69 kV, high voltage cables 70 to 220 kV, and extra high voltage cables excess of 220 kV. Typical cable designs are illustrated in U.S. Pat. Nos. 5,246,783, 6,496,629 and 6,714,707.

"Conductor", "electrical conductor" and like terms mean an object which permits the flow of electrical charges in one or more directions. For example, a wire is an electrical conductor that can carry electricity along its length. Wire conductors typically comprise copper or aluminum.

"Shipping and storage conditions" and like terms mean the temperature, pressure and humidity at which the compositions of this invention, typically in the form of pellets, are shipped from manufacturer to end-user and under which the compositions are held prior to and/or after shipping. Temperatures range from subfreezing (in cold climates) to above 40° C. in an un-air conditioned warehouse in a hot climate. Humidity can range from 0 to 100 percent, and pressure is typically atmospheric.

"Melt" and like terms mean a solid composition in a molten state. A melt may or may not comprise gels and/or solid particulates.

"Gel" and like terms mean a crosslinked polymer, typically in a colloidal state. Gels can vary in size, molecular weight, structure and composition.

"Melt filtration" and like terms mean passing a melt through a filter or screen to remove one or more gels and/or solid particulates from the melt.

"Peroxide-crosslinkable polymer" and like terms mean a polymer, e.g., a polyolefin such as polyethylene, that can be crosslinked under crosslinking conditions, e.g., at a temperature of 160° C. to 250° C., through a free radical mechanism that is initiated by a peroxide, e.g., dicumyl peroxide.

Peroxide-Crosslinkable Polymer

Although any polymer that can be crosslinked by a peroxide-initiated reaction can be used as the peroxide-crosslinkable polymer in the practice of this invention, typically and preferably the polymer is a polyolefin, and more typically and preferably a polyethylene. As that term is used here, polyethylene is a homopolymer of ethylene or a copolymer of ethylene and a minor proportion of one or more alpha-olefins having 3 to 12 carbon atoms, and preferably 4 to 8 carbon atoms, and, optionally, a diene, or a mixture or blend of such homopolymers and copolymers. The mixture can be a mechanical blend or an in situ blend. Examples of the alpha-olefins are propylene, 1-butene, 1-hexene, 4-methyl-1-pentene, and 1-octene. The polyethylene can also be a copolymer of ethylene and an unsaturated ester such as a vinyl ester, e.g., vinyl acetate or an acrylic or methacrylic acid ester.

The polyethylene can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low differential scanning calorimetry (DSC) melting points. The heterogeneous polyethylenes, on the other hand, have a polydispersity (Mw/Mn) greater than 3.5 and do not have a uniform comonomer distribution. Mw is defined as weight average molecular weight, and Mn is defined as number average molecular weight. The polyethylenes can have a density in the range of 0.860 to 0.950 gram per cubic centimeter (g/cc), and preferably have a density in the range of 0.870 to about 0.930 g/cc. They also can have a melt index in the range of about 0.1 to about 50 grams per 10 minutes.

The polyethylenes can be produced by low or high pressure processes. They can be produced in the gas phase, or in the liquid phase in solutions or slurries by conventional techniques. Low pressure processes are typically run at pressures below 1000 psi whereas high pressure processes are typically run at pressures above 15,000 psi.

Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. No. 4,508,842 (heterogeneous polyethylenes) and U.S. Pat. Nos. 5,332,793; 5,342,907; and 5,410,003 (homogeneous polyethylenes); a chromium based catalyst system such as that described in U.S. Pat. No. 4,101,445; a metallocene catalyst system such as those described in U.S. Pat. Nos. 4,937,299, 5,272,236, 5,278,272, and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylene made by high pressure processes (HP-LDPE), linear low density polyethylenes (LLDPE), very low density polyethylenes (VLDPE), medium density polyethylenes (MDPE), high density polyethylene (HDPE) having a density greater than 0.940 g/cc and metallocene copolymers with densities less than 0.900 g/cc. The latter five polyethylenes are generally made by low pressure processes. A conventional high pressure process is described in *Introduction to Polymer Chemistry*, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250° C., and in the tubular reactor, the pressure is in the range of about 25,000 to about 45,000 psi and the temperature is in the range of about 200 to about 350° C. Blends of high pressure polyethylene and metallocene resins are particularly suited for use in the application, the former component for its excellent processability and the latter for its flexibility.

Copolymers comprised of ethylene and unsaturated esters are well known, and can be prepared by the conventional high pressure techniques described above. The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms. The portion of the copolymer attributed to the ester comonomer can be in the range of about 5 to about 50 percent by weight based on the weight of the copolymer, and is preferably in the range of about 15 to about 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. The melt index of the ethylene/unsaturated ester copolymers can be in the range of about 0.5 to about 50 grams per 10 minutes, and is preferably in the range of about 2 to about 25 grams per 10 minutes. One process for the preparation of a copolymer of ethylene and an unsaturated ester is described in U.S. Pat. No. 3,334,081.

The VLDPE can be a copolymer of ethylene and one or more alpha-olefins having 3 to 12 carbon atoms and preferably 3 to 8 carbon atoms. The density of the VLDPE can be in the range of 0.870 to 0.915 g/cc. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the VLDPE are described, respectively, in U.S. Pat. Nos. 4,101,445; 4,302,565; and 4,508,842. The melt index of the VLDPE can be in the range of about 0.1 to about 20 grams per 10 minutes (g/10 min) and is preferably in the range of about 0.3 to about 5 g/10 min. The portion of the VLDPE attributed to the comonomer (s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPR and EPDM, respectively. The third comonomer can be present in an amount of about 1 to 15 percent by weight based on the weight of the copolymer and is preferably present in an amount of about 1 to about 10 percent by weight. Preferably the copolymer contains two or three comonomers inclusive of ethylene.

The LLDPE can include the VLDPE and MDPE, which are also linear, but, generally, has a density in the range of 0.916 to 0.925 g/cc. It can be a copolymer of ethylene and one or more alpha-olefins having 3 to 12 carbon atoms, and preferably 3 to 8 carbon atoms. The melt index can be in the range of about 1 to about 20 g/10 min, and is preferably in the range of about 3 to about 8 g/10 min. The alpha-olefins can be the same as those mentioned above, and the catalysts and processes are also the same subject to variations necessary to obtain the desired densities and melt indices.

As noted, included in the definition of polyethylene are homopolymers of ethylene made by a conventional high pressure process. The homopolymer preferably has a density in the range of 0.910 to 0.930 g/cc. The homopolymer can also have a melt index in the range of about 1 to about 5 g/10 min, and preferably has a melt index in the range of about 0.75 to about 3 g/10 min. Melt index is determined under ASTM D-1238, Condition E. It is measured at 190° C. and 2160 grams.

Peroxide

Although inorganic peroxides can be used in the peroxide used in the practice of this invention, typically and preferably the peroxide is an organic peroxide with a decomposition temperature of 100 to 220° C. for a half-life of 10 minutes. Exemplary organic peroxides (with their decomposition temperatures in ° C. following in parenthesis) include, but are not limited to, succinic acid peroxide (110), benzoyl peroxide (110), t-butyl peroxy-2-ethyl hexanoate (113), p-chlorobenzoyl peroxide (115), t-butyl peroxy isobutylate (115), t-butyl peroxy isopropyl carbonate (135), t-butyl peroxy laurate (140), 2,5-dimethyl-2,5-di(benzoyl peroxy)hexane (140), t-butyl peroxy acetate (140), di-t-butyl diperoxy phthalate (140), t-butyl peroxy maleic acid (140), cyclohexanone peroxide (145), t-butyl peroxy benzoate (145), dicumyl peroxide (150), 2,5-dimethyl-2,5-di(t-butyl-peroxy)hexane (155), t-butyl cumyl peroxide (155), t-butyl hydroperoxide (158), di-t-butyl peroxide (160), 2,5-dimethyl-2,5-di(t-butyl peroxy)hexane-3 (170), and alpha,alpha'-bis-t-butylperoxy-1,4-diisopropylbenzene (160).

In the practice of the various embodiments of this invention, the peroxide is typically and preferably added to the peroxide-crosslinkable polymer compositions as a liquid after the compositions have been melt filtered and formed into pellets. The peroxide is typically sprayed onto the pellets although alternative forms of application can be employed, e.g., immersion, splashing, etc. The melt-filtered composition, typically in the form of a pellet, is thus impregnated, e.g., soaked, with the peroxide, optionally in combination with one or more additives, e.g., cure co-agents, antioxidants, scorch inhibitors, nitrogenous bases, etc., typically until the pellet is dry to the touch Once the peroxide and any additives are absorbed into the pellet, the pellet is ready for packaging. The amount of peroxide applied to and subsequently absorbed by the pellets is such that the pellet typically has a peroxide concentration of 0.5-2.5 wt %, more typically of 0.5-2.0 wt % and even more typically of 0.85-1.9 wt %. In other embodiments peroxide is compounded into the polymer prior to melt filtration.

Nitrogenous Base

Under acidic conditions peroxide efficiency can decrease with storage time. Furthermore, water can be generated during the peroxide-initiated crosslinking process. The presence of water in the insulation is not desirable because it can form voids in the material and induce other concerns with respect to the material's electrical performance under high electrical stress conditions. The decrease of peroxide efficiency with storage time is not desirable because this imposes a limitation on the compound's shelf life. WO 99/21194 discloses that the use of specific N-substituted hindered amine stabilizers comprised of 2,2,6,6-tetramethylpiperidine at concentrations of 0.1 to 0.5 weight percent can be used to minimize the formation of water with sulfur-containing antioxidants at levels of below 0.15 weight percent while maintaining acceptable heat aging performance. Acid (induced/catalyzed) decomposition of the cumyl alcohol generated in the peroxide-initiated crosslinking process can be effectively inhibited by adding a small amount of a material that acts like a base. When crosslinking, using the combination of [1,3,5-tris(4-tert-butyl-3-hydroxy-2,6-dimethylbenzyl)-1,3,5-triazine-2,4,6-(1H,3H, 5H)-trione] and distearylthiodipropionate (DSTDP) with an organic peroxide, the acid decomposition of the cumyl alcohol can be effectively minimized with very low levels of a HAS (hindered amine stabilizer), and these levels are much lower than those discussed in WO 99/21194. The HAS concentration can be effective from levels of 0.002 to 0.1 percent by weight of the polymer. When using a HAS with the combination of [1,3,5-tris(4-tert-butyl-3-hydroxy-2,6-dimethylbenzyl)-1,3,5-triazine-2,4,6-(1H,3H,5H)-trione] and DSTDP, the composition is not limited to N-substituted hindered amine stabilizers comprised of 2,2,6,6-tetramethylpiperidines to have acceptable heat aging stability. Additionally, this combination of [1,3,5-tris(4-tert-butyl-3-hydroxy-2,6-dimethylbenzyl)-1,3,5-triazine-2,4,6-(1H,3H, 5H)-trione], DSTDP and very low HAS concentration provides the peroxide containing material with a long shelf life and low moisture generation during cure.

Examples of HAS compounds include, but are not limited to, (i) 1,6-hexanediamine, N,N'-bis(2,2,6,6,-tetramethyl-4-piperidinyl)-polymer with 2,4,6 trichloro-1,3,5triazine, reaction products with N-butyl-1-butanamine and N-butyl-2,2, 6,6-tetramethyl-4-piperidinamine; (ii) poly[[6-[(1,1,3,3-tetramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]); and (iii) 1,6-hexaneidamine, N,N'-Bis(2,2,6,6-tetramethyl)-4-piperidinyl)-,polymers with 2,4-dichloro-6-(4-morpholinyl)-1,3,5-triazine. An alternative description of HAS (iii) is poly[(6-morpholino-s-triazine-2,4-diyl)[2,2,6,6-tetramethyl-4-piperidyl)imino]-hexamethylene [2,2,6,6-tetramethyl-4-piperidyl)imino]]. Other examples of HAS compounds can be found on pages 2 to 8 in *Oxidation Inhibition in Organic Materials* by J. Pospisil and P. P. Klemchuk, Volume II. The nitrogenous bases used in the practice of this invention can be used alone or in combinations of two or more.

In those embodiments in which the nitrogenous base is added after the melt is filtered, the molecular weight and physical state, e.g., solid, liquid, etc. can vary widely although preferably the base is of low molecular weight and/or of a low melting point, or it is liquid. In those embodiments in which the nitrogenous base is added prior to filtering the melt through a micro-screen (less than 100 μm mesh size), the base is of a low molecular weight or of a low melting point, or it is liquid under ambient conditions (i.e., 23° C. and atmospheric pressure). As used in the context of the nitrogenous bases that can be used in the practice of this invention, "low molecular weight" means non-polymeric, non-oligomeric and/or of a molecular weight not in excess of 1400 grams per mole (g/mol), preferably not in excess of 1000 g/mol and more preferably not in excess of 750 g/mol. As used in the context of the nitrogenous bases that can be used in the practice of this invention, "low melting" means a melting temperature not in excess of 95° C., preferably not in excess of 90° C. and more preferably not in excess of 85° C., as measured by peak melting point using DSC. Examples of low molecular weight, low melting point, and/or liquid nitrogenous bases that can be used in the practice of this invention include triallyl cyanurate (TAC), and TINUVIN™ 765 from BASF (mixture of bis(1,2,2,6,6-pentamethyl-4-piperidyl)sebacate and methyl 1,2,2,6,6-pentamethyl-4-piperidyl sebacate), TINUVIN™ 770 (Bis(2,2,6,6,-tetramethyl-4-piperidyl)sebaceate) from BASF, UVINUL™ 4050 (N,N'-bisformyl-N,N'-bis-(2,2,6,6-tetramethyl-4-piperidinyl)-hexamethylendiamine) from BASF, TINUVIN™ 622 (Butanedioic acid, dimethylester, polymer with 4-hydroxy-2,2,6,6-tetramethyl-1-piperidine ethanol) from BASF, TINUVIN™ 123 (Bis-(1-octyloxy-2,2,6,6-tetramethyl-4-piperidinyl) sebacate) from BASF, CYASORB™ 3853 ((2,2, 6,6-Tetramethyl-4-piperidine) stearate) from Cytec industries.

Although TAC is typically considered as cure booster, its use in the practice of the present invention is as a nitrogenous base, not as a cure booster. As such, the amount of TAC used in the practice of this invention is typically well below the amount when used as a cure booster. Typical amounts used in the practice of this invention range from 0.0005 to 0.03 wt %, preferably from 0.002 to 0.01 wt %, based on the weight of the composition.

Antioxidants

The antioxidants that can be used in the practice of this invention include, but are not limited to, hindered phenols such as tetrakis[methylene(3,5-di-tert-butyl-4-hydroxy-hydro-cinnamate)]methane, bis[(beta-(3,5-ditert-butyl-4-hydroxybenzyl)-methylcarboxyethyl)]-sulphide, and thiodiethylene bis(3,5-di-tert-butyl-4-hydroxy hydrocinnamate); phosphites and phosphonites such as tris(2,4-di-tert-butyl-phenyl)phosphite and di-tert-butylphenyl-phosphonite; thioesters such as dilaurylthiodipropionate, dimyristylthiodipropionate, di stearylthiodipropionate (DSTDP), and pentaerythritol tetrakis (B-laurylthiopropionate); various siloxanes. Additional examples can be found in *Plastic Additives Handbook*, Gachter et al, 1985. Antioxidants can be used in amounts of about 0.05 to about 5 percent by weight based on the weight of the composition. Preferably the composition comprises a sulfur-containing antioxidant, e.g. a thioester, especially DSTDP. The antioxidants can be used alone or in combinations of two or more and will be referred to as AO.

Additives

Additional additives can be added to the polymer melt before, during and/or after processing. The amount of additive is usually in the range of about 0.01 to about 3 percent by weight based on the weight of the polymer. Useful additives include additional antioxidants, ultraviolet absorbers, antistatic agents, slip agents, plasticizers, processing aids, lubricants, stabilizers, flow aids, lubricants, water tree inhibitors such as polyethylene glycol, cure boosters, scorch inhibitors, and viscosity control agents.

Pre-Blend Process

In one embodiment the invention is a process for making a peroxide-crosslinkable pellet, the process comprising the steps of first forming a homogeneous melt of a peroxide-crosslinkable polymer and pre-blend of triallyl cyanurate (TAC) and one or more antioxidants (AO), and then passing the homogeneous melt through a filter with a mesh size of less than 100 μm, and then forming pellets from the filtered homogeneous melt. The pre-blend typically comprises or consists essentially of 0.6-66 wt %, more typically 0.6-3 wt % and even more typically 0.6-1.5 wt %, TAC and 34-99.4 wt %, more typically 97-99.4 wt % and even more typically 98.5-99.4 wt %, AO.

Preferred antioxidants are phenolic-based AO, sulfur-based AO, and combinations of phenolic- and sulfur-based AO. Illustrative examples of AO useful in this embodiment of the invention include, but are not limited to, CYANOX™ 1790, TBM6 (4,4'-thio-bis (3-methyl-6 tert-butylphenol), TBP6 (2,2'-Thiobis(6-tert-butyl-p-cresol)), IRGANOX 1010 (pentaerythritol tetrakis(3-(3,5-di-tert-butyl-4-hydroxyphenyl)propionate), IRGANOX 1035 (thiodiethylene bis[3-[3,5-di-tert-butyl-4-hydroxyphenyl]propionate]), IRGASTAB KV10 (4,6-bis (octylthiomethyl)-o-cresol), DSTDP (distearylthiodipropionate), DLTDP (dilaurylthiodipropionate) NAUGARD 4125S (pentaerythritol tetrakis(β-laurylthiopropionate), and combinations of two or more of these AO. CYANOX products are available from Cytec, IRGANOX and IRGASTAB products are available from BASF, and NAUGARD products are available from Addivant. Most preferred AOs are TBM-6 and antioxidant blends described in U.S. Pat. Nos. 6,187,858 and 6,187,847.

Pre-blend can be prepared by methods well known in the art to produce a homogeneous mixture of chemicals and may include melt blending and solvent blending.

The peroxide-crosslinkable polymer is typically a polyolefin, and more typically a polyethylene. The homogenous blend of peroxide-crosslinkable polymer and pre-blend typically comprises or consists essentially of 95-99.9 wt %, more typically 96-98 wt % and even more typically 97-98 wt %, crosslinkable polymer and 0.1-0.6 wt %, more typically 0.2-0.5 wt % and even more typically 0.2-0.4 wt %, pre-blend.

The peroxide-crosslinkable polymer and pre-blend are typically and preferably mixed in a single or twin screw extruder and then passed through a fine mesh screen or filter. The conditions of the compounding are such to produce a homogeneous melt of the polymer and pre-blend, e.g., at a temperature of 140-250° C., or 160-235° C. or 170-225° C. The mesh size of the screen is typically less than 100 microns (μm), more typically less than 75 μm and even more typically less than 50 μm. In the most preferred embodiment it is <25 μm. The composition of the screen can vary to convenience but is typically metallic, e.g., stainless steel.

Once the homogenous melt of polymer and pre-blend has passed through the filter or screen, the melt is removed from the mixer, e.g., extruded from the extruder, and formed into pellets of the desired size and shape. In a further, optional step, the pellets are impregnated with a peroxide, typically by spraying or otherwise applying a liquid peroxide to the pellets and allowing the pellets to absorb the peroxide. In one embodiment the peroxide is mixed with one or more additives before the peroxide is applied to the pellets. In one embodiment, the additives include additional TAC and/or other low molecular weight or low melting or liquid nitrogenous bases. Once cooled the pellets, with or without absorbed peroxide, are ready for use, shipping and/or storage.

Low Molecular Weight or Low Melting or Liquid Nitrogenous Base Process

In one embodiment the invention is a process for making a peroxide-crosslinkable pellet, the process comprising first forming a homogeneous melt of (i) a peroxide-crosslinkable polymer, (ii) a low molecular weight, or liquid, or low melting nitrogenous base, and, (iii) one or more antioxidants (AO), and then passing the homogeneous melt through a filter with a mesh size of less than 100 μm, and then forming pellets from the filtered homogeneous melt. In one embodiment the homogenous melt typically comprises or consists essentially of 95-99.9 wt %, more typically 96-98 wt % and even more typically 97-98 wt %, peroxide-crosslinkable polymer, and 0.0005-0.09 wt %, more typically 0.001-0.03 wt % and even more typically 0.002-0.01 wt %, nitrogenous base. In one embodiment the homogenous melt typically comprises or consists essentially of 95-99.9 wt %, more typically 96-98 wt % and even more typically 97-98 wt %, peroxide-crosslinkable polymer; 0.0005-0.09 wt %, more typically 0.001-0.03 wt % and even more typically 0.002-0.01 wt %, nitrogenous base; and 0.01-0.6 wt %, more typically 0.1-0.5 wt % and even more typically 0.1-0.4 wt %, AO.

The peroxide-crosslinkable polymer is typically a polyolefin, and more typically a polyethylene, and the low molecular weight, or low melting, or liquid nitrogenous base is as described above. In one embodiment the base is TAC and/or UVINUL™ 4050 from BASF (N,N'-1,6-hexanediyl-bis(N-(2,2,6,6-tetramethyl-4-piperidinyl)-formamide). The optional antioxidant is as described above. Preferred AO include CYANOX™ 1790, TBM6, TBP6 (2,2'-Thiobis(6-tert-butyl-p-cresol)), IRGANOX 1010, IRGANOX 1035, DSTDP, DLTDP, NAUGARD™ 412S, and combinations of two or more of these AO. In the preferred embodiment the composition contains at least one sulfur-containing AO, e.g., DSTDP, DLTDP and NAUGARD™ 412S.

The operational steps of and equipment used in (1) forming the homogeneous melt of (A) peroxide-crosslinkable polymer, (B) low molecular weight, or liquid, or low melting nitrogenous base, and (C) AO, (2) filtering the homogeneous melt, and (3) forming pellets from the filtered melt are the same as described above for the pre-blend process.

In a further, optional step, the pellets are impregnated with a peroxide, typically by spraying or otherwise applying a liquid peroxide to the pellets and allowing the pellets to absorb the peroxide. In one embodiment the peroxide is mixed with one or more additives before the peroxide is applied to the pellets. In one embodiment, the additives include additional TAC and/or TINUVIN™ 765 and/or other low molecular weight, or liquid, or low melting nitrogenous bases at 0.0005% to 0.01%. Once cooled the pellets, with or without absorbed peroxide, are ready for use, shipping and/or storage.

Soaking Process

In one embodiment the invention is a process for making a peroxide-crosslinkable pellet, the process comprising first forming a melt of a peroxide-crosslinkable polymer and then passing the melt through a filter with a mesh size of less than 100 μm, and then forming pellets from the filtered homogeneous melt, and then impregnating the pellets with a low molecular weight, or a low melting, or liquid nitrogenous base. The peroxide-crosslinkable polymer is typically a polyolefin, and more typically a polyethylene, and it may be combined with one or more additives, e.g., antioxidants such as those described above. The operational steps of and equipment used in (1) forming the melt of the peroxide-crosslinkable polymer with or without additives, (2) filtering the melt, and (3) forming pellets from the filtered melt are the same as described above for the pre-blend and low molecular weight or low melting or liquid nitrogenous base processes.

The low molecular weight, or low melting, or liquid nitrogenous base is as described above. In one embodiment the base is TAC and/or TINUVIN™ 765 and/or other low molecular weight, or liquid, or low melting nitrogenous bases at 0.0005% to 0.01%. The optional antioxidant is also as described above. Preferred AO include CYANOX™ 1790, TBM6, TBP6 (2,2'-Thiobis(6-tert-butyl-p-cresol)), IRGANOX 1010, IRGANOX 1035, DSTDP, DLTDP, NAUGARD™ 412S, and combinations of two or more of these AO. In the preferred embodiment the composition contains at least one sulfur-containing AO, e.g., DSTDP, DLTDP and NAUGARD™ 412S. Most preferred AOs are TBM-6 and antioxidant blends described in U.S. Pat. Nos. 6,187,858 and 6,187,847.

The pellets are then impregnated with a low molecular weight, or a low melting, or liquid nitrogenous base, typically and preferably in combination with a peroxide, by spraying or otherwise applying the base and optional peroxide to the pellets and allowing the pellets to absorb the base and optional peroxide. The base and peroxide are liquid at the time and temperature of their application to the pellets. In one embodiment the base is mixed with the peroxide and/or one or more additives before it is applied to the pellets. In one embodiment the pellet, after application of the low molecular weight, or low melting, or liquid base, typically comprises or consists essentially of 95-99.9 wt %, more typically 96-98 wt % and even more typically 97-98 wt %, peroxide-crosslinkable polymer, and 0.001-0.09 wt %, more typically 0.001-0.03 wt % and even more typically 0.002-0.01 wt %, nitrogenous base. In one embodiment the pellet, after application of the low molecular weight, or low melting, or liquid base, typically comprises or consists essentially of 95-99.9 wt %, more typically 96-98 wt % and even more typically 97-98 wt %, peroxide-crosslinkable polymer; 0.0005-0.09 wt %, more typically 0.001-0.03 wt % and even more typically 0.002-0.01 wt %, nitrogenous base; and 0.01-0.6 wt %, more typically 0.1-0.5 wt % and even more typically 0.1-0.4 wt %, AO. In one embodiment the composition comprises a sulfur-containing antioxidant, e.g., DSTDP.

Once cooled the pellets, with or without absorbed peroxide, are ready for use, shipping and/or storage.

Wire and Cable

The peroxide-crosslinkable polymer compositions of this invention can be applied to a cable as an insulation known amounts and by known methods (for example, with the equipment and methods described in U.S. Pat. Nos. 5,246,783 and 4,144,202). Typically, the sheath composition is prepared in a reactor-extruder equipped with a cable-coating die and after the components of the composition are formulated, the composition is extruded over one or more conductors as the cable is drawn through the die.

EXAMPLES

Stabilized Pre-Blend

The inventive examples use a mixture of a primary antioxidant, CYANOX™ 1790 from Cytec (1,3,5-tris(4-tert-butyl-3-hydroxy-2,6-dimethyl benzyl)-1,3,5-triazine-2,4,6-

(1H,3H,5H)-trione), and a synergistdistearylthiodipropionate (DSTDP) blended with triallyl cyanurate (TAC). The ratio of the primary AO and synergist in all examples is about 0.63:1.

Example 1

Example 1 is a 1:1 pre-blend of TAC and AO mixture (50 wt % TAC+31 wt % DSTDP+19 wt % CYANOX™ 1790). Differential scanning calorimetry (DSC) thermograms of all samples are shown in the figures. DSC experiments are run in air with 10° C./min ramp rate. Peak onset, peak maximum and enthalpy values for these thermograms are collated in Table 1. For the AO mixture without TAC (61 wt % DSTDP+39 wt % CYANOX™ 1790), there are two main peaks: a sharp endotherm at about 60° C. (peak 1) and a broad exotherm between 245 and 285° C. (peak 2). Thermogram for TAC (no AO) also shows two peaks, a sharp exotherm at ~200° C. (peak 3) and a broad exotherm between 255° C. and 295° C. (peak 4).

When the AO mixture and TAC are pre-blended in a 1:1 ratio in Example 1, surprisingly, no trace of peak 3 is observed, while there is no significant effect (apart from dilution) on the other peaks (1, 2, and 4). Example 1 therefore only has two peaks: peak 5 which comes from the AO mixture (similar to peak 1) and peak 6 which is a combination of peaks 2 and 4. This result is clearly shown in FIG. 1 where all three thermograms are collated. Peak 3 in the TAC thermogram is a highly exothermic sharp peak indicating a safety hazard and a potential for explosion. The inventive mixture of Example 1 completely annihilates this peak (reaction), significantly improving the safety. Hence, the handling and introduction of the AO and TAC as a pre-blend is safer than handling and introducing the components individually.

Comparative and Control Examples

Figure 3:
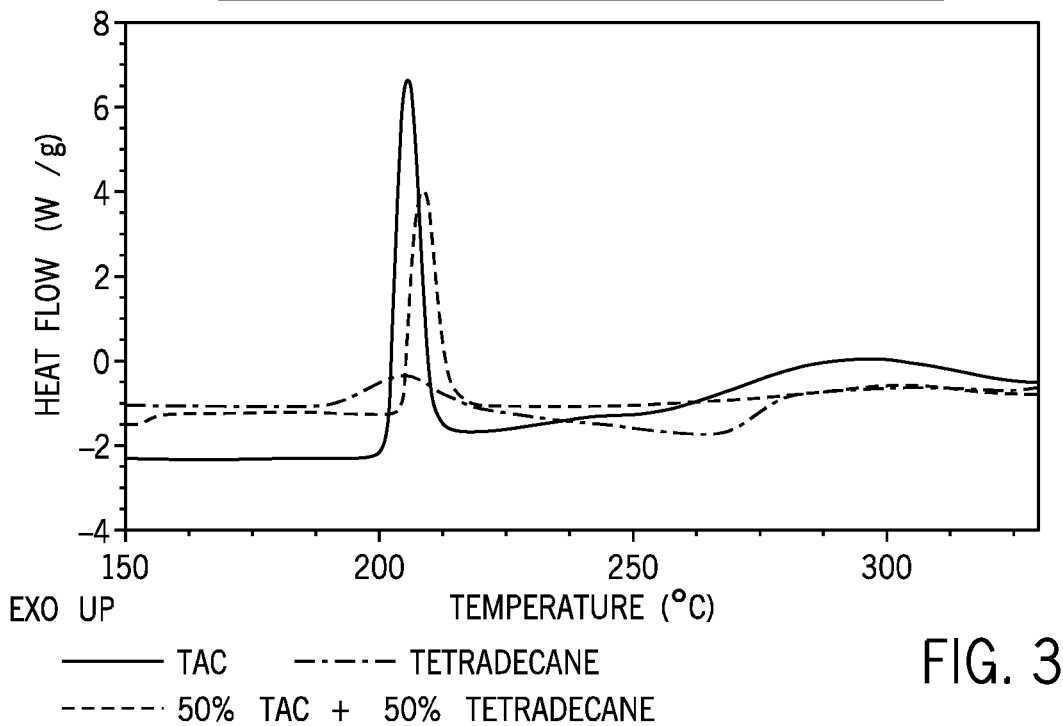
FIG. 3 is a chart reporting the thermograms for the Comparative Example TAC, tetradecane, and pre-blend of TAC and tetradecane mixture at a 1:1 weight ratio.

A unique feature of this invention is that elimination of an exothermic peak is not a universal effect in all TAC+solvent blends. To prove this, DSC experiments are conducted on a comparative formulation similar to that used in Example 1 except tetradecane is substituted for the AO mixture: 50 wt % tetradecane+50 wt % TAC. Control experiments are also run on a neat tetradecane sample. FIG. 3 compares the thermograms of the Comparative Example to that of TAC and tetradecane, and the exothermic TAC peak (peak 3) is clearly observed in the mixture as peak 9. Peak onset, peak maximum and enthalpy values for these thermograms are collated in Table 1.

Compositions Comprising Low Molecular Weight Nitrogenous Bases

In this embodiment the invention is a composition comprising low molecular weight, liquid or low melting organic nitrogenous bases (subsequently referred to as low molecular weight or low melting bases) along with sulfur-based antioxidants. Examples of such bases are given in Table 2. Preferred examples of such bases include UVINUL™ 4050 and triallyl cyanurate (TAC). CYASORB™ 3346 and CHIMASSORB™ 2020 are comparative examples, with both high molecular weights and high melting points.

TABLE 2

Examples of Low and High Molecular Weight Nitrogenous Bases

|  | Molecular Weight | Melting Point (° C.) |
|---|---|---|
| TAC | 249 | 28 |
| Uvinul 4050 | 450 | 158 |
| Tinuvin 622 | 3100-5000 | 60 |
| Tinuvin 765 | 509 | 20 |
| Tinuvin 123 | 737 | <20 |
| Cyasorb 3853 | 438 | 30 |
| Tinuvin 770 | 481 | 85 |
| Cyasorb 3346 | 1600-1700 | 100 |
| Chimassorb 2020 | 2600-3400 | 120-150 |

TABLE 1

Peak Descriptions, Onsets, Maximums, and Enthalpies of AOs, TAC, Tetradecane and Their Mixtures

|  | Composition | Peak # | Peak Energy | Peak Type | Peak onset (C.) | Peak max (C.) | Enthalpy (J/g) |
|---|---|---|---|---|---|---|---|
| Control Sample | 61% DSTDP + 39% Cyanox 1790 mixture | 1 | endotherm | Sharp | 59.2 | 61.7 | 137.1 |
|  |  | 2 | exotherm | broad | 244.2 | 284.6 | 202.4 |
| Control sample | TAC | 3 | exotherm | Sharp | 201.8 | 205.6 | 274.2 |
|  |  | 4 | exotherm | broad | 258.9 | 293.5 | 237.0 |
| Inventive example 1 | 50% TAC + 31% DSTDP + 19% Cyanox 1790 mixture | 5 | endotherm | Sharp | 57.1 | 65.3 | 87.8 |
|  |  | 6 | exotherm | broad | 254.7 | 281.2 | 178.1 |
| Inventive example 2 | 2% TAC + 60% DSTDP + 38% Cyanox 1790 mixture | 7 | endotherm | Sharp | 60.3 | 62.5 | 107.9 |
|  |  | 8 | exotherm | broad | 249.8 | 286.0 | 87.2 |
| Comparative Sample | 50% TAC + 50% Tetradecane | 9 | exotherm | Sharp | 204.7 | 208.7 | 178.9 |
|  |  | 10 | exotherm | broad | 272.3 | 300.0 | 68.4 |
| Control Sample | Tetradecane | 11 | exotherm | broad | 191.3 | 205.9 | 75.1 |
|  |  | 12 | endotherm | broad | 221.0 | 266.1 | 180.7 |

Example 2

Figure 2:
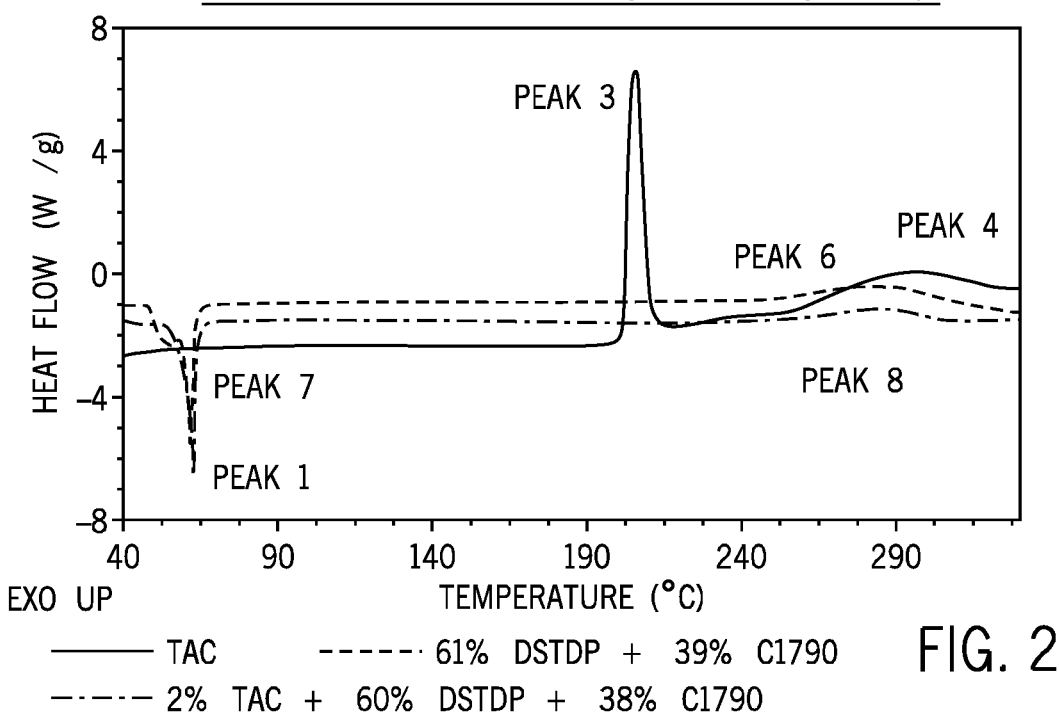
FIG. 2 is a chart reporting the thermograms for the Inventive Example 1 TAC, AO mixture, and pre-blend of TAC and the AO mixture at a 2:98 weight ratio.

The composition of Example 2 is 2 wt % TAC+60 wt % DSTDP+38 wt % CYANOX™ 1790. This blend is at TAC levels that will not significantly alter the cure characteristics of the formulation in which the AO+TAC pre-blend is added. This is within the preferred compositional range. Example 1 clearly demonstrates the effect of AOs in eliminating one of the exothermic reactions in TAC. FIG. 2 shows the elimination of peak 3 in the second composition as well. Peak onset, peak maximum and enthalpy values for these thermograms are collated in Table 1.

UVINUL™ 4050 from BASF (N,N'-1,6-hexanediylbis(N-(2,2,6,6-tetramethyl-4-piperidinyl)-formamide) is a low molecular weight base, and TAC has both a low molecular weight and a low melting point. On the other hand CYASORB™ 3346 from Cytec (Poly[[6-(4-morpholinyl)-1,3,5-triazine-2,4-diyl][(2,2,6,6-tetramethyl-4-piperidinyl)imino]-1,6-hexanediyl-[(2,2,6,6-tetramethyl-4-piperidinyl)imino]]) and CHIMASSORB™ 2020 from BASF (1,6-Hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine) have both high molecular weight and high melting point. TINUVIN™ 765 from BASF (mixture of bis(1,2,2,6,6-pentamethyl-4-piperidyl)sebacate and methyl 1,2,2,6,6-pentamethyl-4-piperidyl sebacate) is a liquid base.

When low molecular weight or low melting bases are used in formulations containing sulfur based antioxidants, surprisingly, there is a significant reduction in screen buildup during the production of these formulations in an extruder. Experiments are run on a ZSK-30 twin screw extruder to simulate the screen build up. Additive loadings used in these experiments are: 1.37 wt % DSTDP+0.83 wt % CYANOX™ 1790+344 parts per million (ppm) of base. These loadings are nearly six times of what is used in the preferred embodiment, and are used to accelerate the screen build up. In other words, these tests with 344 ppm of base simulate the performance expected when using approximately 50 ppm of the same bases in an actual application. Experiments are run at 245° C. Stacks of screens ranging from 23 μm openings to 200 μm openings are used for each case, i.e. in each case, the finest screen present had 23 μm openings. Post extrusion, the screen packs are delaminated, polymer is removed by toluene wash, and plate out is measured by immersing the 23 μm opening screen in water and weighing the water soluble extract. Table 3(a) shows the build up on the screens in terms of milligrams (mg) of water soluble extract for various formulations. Build up of all the low molecular weight or low melting buffers is lower than that of CYASORB™ 3346.

Less screen build up correlates to longer run times in the production cycles and hence the higher yields of extra clean product for extra high-voltage applications. As the screen starts to build up, the pressure builds up at the breaker plate until it reaches a level where it becomes ineffective to operate. As shown in Table 3(b) where pressure rise data from actual plant runs are presented, when the formulations of the Comparative Examples (containing 0.225% DSTDP+0.137% CYANOX™ 1790+0.0075% CYASORB™ 3346) and (containing 0.225% DSTDP+0.137% CYANOX™ 1790+0.0075% CHIMASSORB™ 2020) are run, the average rate of pressure rise is 0.7 bar/hour. This would lead to run lengths of less than 3 days before reaching a point where it becomes ineffective to operate. Small improvements can be made to the comparative examples by reducing the loadings of the additives. A formulation containing 0.200% DSTDP+0.120% CYANOX™ 1790+0.0022% CYASORB™ 3346 gave a pressure rise of 0.5 bar/hour which would make the run length just over four days. Even at this run length, however, very small yields of extra clean product can be obtained. On the other hand, our inventive (preferred) examples containing (0.200% DSTDP+0.120% CYANOX™ 1790+0.0030% UVINUL™ 4050) and (0.200% DSTDP+0.120% CYANOX™ 1790+0.0050% TAC) give no pressure rise in the plant, thus giving very long run lengths and very good yields of the extra clean product.

TABLE 3(b)

Rate of Pressure Rise from Commercial Plant Runs for Compounded High Molecular Weight Bases (Comparative) and Low Molecular Weight and/or Low Melting Nitrogenous Bases (Preferred Inventive) Present during Extrusion

| Example | Additive composition in peroxide crosslinkable polymer | Pressure rise during extrusion (bar/hr) |
|---|---|---|
| Inventive, Preferred | 0.200% DSTDP + 0.120% Cyanox 1790 + 0.0030% Uvinul 4050 | 0.0 |
| Inventive, Preferred | 0.200% DSTDP + 0.120% Cyanox 1790 + 0.0050% TAC | 0.0 |
| Comparative | 0.200% DSTDP + 0.120% Cyanox 1790 + 0.0022% high molecular weight base Cyasorb 3346 | 0.5 |
| Comparative | 0.225% DSTDP + 0.137% Cyanox 1790 + 0.0075% high molecular weight base Cyasorb 3346 | 0.7 |

TABLE 3(a)

Inventive, Preferred, and Comparative Examples, Screen Build up Measured as Water-Soluble Extract in mg

| | | Formulation in LDPE | Build up, mg of water soluble extract on the screens |
|---|---|---|---|
| Inventive examples | Preferred examples | 1.37% DSTDP + 0.83% C1790 + 0.0344% TAC | 0.6 |
| | | 1.37% DSTDP + 0.83% C1790 + 0.0344% Uvinul 4050 | 0.4 |
| | | 1.37% DSTDP + 0.83% C1790 + 0.0344% Tinuvin 622 | 0.6 |
| | | 1.37% DSTDP + 0.83% C1790 + 0.0344% Tinuvin 765 | 0.5 |
| | | 1.37% DSTDP + 0.83% C1790 + 0.0344% Tinuvin 123 | 0.4 |
| | | 1.37% DSTDP + 0.83% C1790 + 0.0344% Cyasorb 3853 | 0.6 |
| | | 1.37% DSTDP + 0.83% C1790 + 0.0344% Tinuvin 770 | 0.3 |
| Comparative example | | 1.37% DSTDP + 0.83% C1790 + 0.0344% Cyasorb 3346 | 1.1 |

TABLE 3(b)-continued

Rate of Pressure Rise from Commercial Plant Runs for Compounded High Molecular Weight Bases (Comparative) and Low Molecular Weight and/or Low Melting Nitrogenous Bases (Preferred Inventive) Present during Extrusion

| Example | Additive composition in peroxide crosslinkable polymer | Pressure rise during extrusion (bar/hr) |
|---|---|---|
| Comparative | 0.225% DSTDP + 0.137% Cyanox 1790 + 0.0075% high molecular weight base Chimassorb 2020 | 0.7 |

There are two main advantages that a base imparts to the sulfur-based AO containing formulations: (1) it provides storage stability to the peroxide, and (2) it mitigates the undesirable generation of water during cure. To measure the peroxide stability, samples are placed in an oven at 70° C. and the cure potential (MDR-Mh) of these is analyzed periodically. A base is considered effective in maintaining the storage stability of peroxide if there is more than 90% retention in cure (retention of initial Mh) after two weeks of aging at 70° C. This is used to provide prediction of shelf life at room temperature. Table 4 shows the MDR-Mh values of the inventive, preferred, comparative, and control samples over two weeks of aging. Based on the percentage change in Mh of aged sample from the initial, samples are assigned a pass or fail rating. Samples in the table are compounded in a pilot plant on a ZSK-30 twin screw extruder and subsequently impregnated (soaked) with peroxide. All samples contained 0.20 wt % DSTDP+0.12 wt % CYANOX™ 1790+1.8 wt % dicumyl peroxide (Dicup) and 0.0050 wt % of the respective buffer.

TABLE 4

Inventive, Preferred, Comparative, and Control Samples: Peroxide Stability Measured by Retention of Cure

|  | Formulation in LDPE | MDR-Mh @ 182 C. after t days of aging at 70 C. | | | | % Mh retention at 14 days | Peroxide stabiliy |
|---|---|---|---|---|---|---|---|
|  |  | t = 0 | t = 2 | t = 7 | t = 14 | | |
| Preferred example 1 | 0.20% DSTDP + 0.12% C1790 + 0.005% TAC | 2.60 | 2.60 | 2.56 | 2.50 | 96 | Pass |
| Preferred example 2 | 0.20% DSTDP + 0.12% C1790 + 0.005% Uvinul 4050 | 2.66 | 2.71 | 2.71 | 2.72 | 102 | Pass |
| Inventive examples | 0.20% DSTDP + 0.12% C1790 + 0.005% Tinuvin 622 | 2.53 | 2.66 | 2.65 | 2.61 | 103 | Pass |
|  | 0.20% DSTDP + 0.12% C1790 + 0.005% Tinuvin 765 | 2.65 | 2.66 | 2.72 | 2.66 | 100 | Pass |
|  | 0.20% DSTDP + 0.12% C1790 + 0.005% Tinuvin 123 | 2.66 | 2.61 | 2.66 | 2.61 | 98 | Pass |
|  | 0.20% DSTDP + 0.12% C1790 + 0.005% Cyasorb 3853 | 2.77 | 2.66 | 2.69 | 2.75 | 99 | Pass |
|  | 0.20% DSTDP + 0.12% C1790 + 0.005% Tinuvin 770 | 2.57 | 2.68 | 2.74 | 2.67 | 104 | Pass |
| Comparative example | 0.20% DSTDP + 0.12% C1790 + 0.005% Cyasorb 3346 | 2.51 | 2.72 | 2.67 | 2.25 | 90 | Pass |
| Control | 0.20% DSTDP + 0.12% C1790 | 2.97 | 2.97 | 2.46 | 0.62 | 21 | Fail |

Among the inventive formulations with bases that minimize screen build up and provide good peroxide stability, the ones that give the optimum combination of other properties are TAC and UVINUL™ 4050, and hence are the preferred bases in this invention. Table 5 compares the electrical properties and the effectiveness of the base in mitigating water generation post curing for our preferred, inventive, and comparative examples. Comparison of electrical and buffer properties is made for various buffers in formulations containing 0.2 wt % DSTDP, 0.12 wt % CYANOX™ 1790, 1.8 wt % Dicup and 0.005 wt % buffer. TINUVIN™ 765, TINUVIN™ 123, CYASORB™ 3853, and TINUVIN™ 770 do not adequately mitigate undesirable water generation. The samples with DSTDP, Cyanox 1790 and no base are expected to give moisture values higher than all the entries in Table 5. Hence df measurements were not performed on TINUVIN™ 123, CYASORB™ 3853, and TINUVIN™ 770 containing formulations. TINUVIN™ 622 and TINUVIN™ 765 give high df values at high temperature (130° C.) and high stresses (20 kV/mm), which is undesirable for high voltage insulation applications. The df measurements are made on model cables. Preferred examples, TAC and UVINUL™ 4050 provide significant effectiveness both in terms of peroxide stability and mitigation of water generation, and have low df value at high temperature and high stress, while giving low level of screen build up.

TABLE 5

Preferred, Inventive, and Comparative Examples

| | Formulations In LDPE | Water generation in Karlfischer at 240 C., (ppm) | df @ 98 C., 20 Kv/mm (%) | df @ 130 C., 20 KV/mm (%) |
|---|---|---|---|---|
| Preferred example 1 | 0.20% DSTDP + 0.12% C1790 + 0.005% TAC | 49 | 0.027 | 0.111 |
| Preferred example 2 | 0.20% DSTDP + 0.12% C1790 + 0.005% Uvinul 4050 | 33 | 0.01 | 0.091 |
| Inventive examples | 0.20% DSTDP + 0.12% C1790 + 0.005% Tinuvin 622 | 76 | 0.028 | 0.211 |
| | 0.20% DSTDP + 0.12% C1790 + 0.005% Tinuvin 765 | 219 | 0.017 | 0.222 |
| | 0.20% DSTDP + 0.12% C1790 + 0.005% Tinuvin 123 | 470 | | |
| | 0.20% DSTDP + 0.12% C1790 + 0.005% Cyasorb 3853 | 463 | | |
| | 0.20% DSTDP + 0.12% C1790 + 0.005% Tinuvin 770 | 219 | | |
| Comparative example | 0.20% DSTDP + 0.12% C1790 + 0.005% Cyasorb 3346 | 30 | 0.023 | 0.094 |

Use of TAC as a coagent for cure boosting is known, but the loadings used in this invention are well below the cure boosting levels. Table 6 shows that there is no significant difference between the MDR-Mh values (cure levels) of Example 1 (with 0.005 wt % TAC) and the control (without any TAC). Both formulations had 1.8 wt % Dicumyl peroxide. Thus, the use of TAC at these levels is not obvious in view of the art that teaches its use as a coagent (i.e., cure booster).

TABLE 6

Cure Levels (MDR-Mh at 182° C.) of Example 1 with 0.005 wt % TAC Compared to Same Formulation without TAC

| Formulation | MDR-Mh (lb.-in.) |
|---|---|
| 0.20% DSTDP + 0.12% C1790 + 0.0050% TAC | 2.60 |
| 0.20% DSTDP + 0.12% C1790 | 2.66 |

Soaking Process

The baseline compositions in the inventive and comparative examples of this embodiment of the invention contain two main antioxidants: CYANOX™ 1790 and DSTDP compounded in LDPE. One version of this formulation is made in a production plant and contains 0.137 wt % CYANOX™ 1790 and 0.225 wt % DSTDP (i.e., baseline formulation 1). Another version of this formulation is made in a production plant and contains 0.12 wt % CYANOX™ 1790 and 0.20 wt % DSTDP (i.e., baseline formulation 2). Other versions of the baseline formulation are made at pilot scale on a ZSK-30 twin screw extruder with different AO loadings.

Experiments are conducted in which various nitrogenous bases are dissolved in dicumyl peroxide (Dicup) at 60° C., and pellets of baseline formulation 1 are soaked with the resulting liquid mixture. After soaking the mixture of Dicup (1.8 wt %) and base (0.005 wt %) into baseline formulation 1 (98.195 wt %), the ability of the base to provide peroxide stability during storage and mitigate water formation during cure (the two properties referred to hereinafter as buffering) is assessed. Table 7 summarizes the bases in peroxide-base mixtures used in the examples.

TABLE 7

Solubility of Bases in Dicup at 60° C.

| | Molecular Weight | Melting Point (° C.) | Solubility in Dicup at 60 C., with Dicup:base ratio 360:1 |
|---|---|---|---|
| Tinuvin 765 | 509 | 20 | soluble |
| Tinuvin 770 | 481 | 85 | soluble |
| TAC | 249 | 28 | soluble |
| Tinuvin 622 | 3100-5000 | 60 | soluble |
| Tinuvin 123 | 737 | <20 | soluble |
| Cyasorb 3853 | 438 | 30 | soluble |
| Cyasorb 3346 | 1600-1700 | 100 | not soluble |
| Chimassorb 2020 | 2600-3400 | 120-150 | not soluble |

Bases CYASORB™ 3346 from Cytec (poly[[6-(4-morpholinyl)-1,3,5-triazine-2,4-diyl][(2,2,6,6-tetramethyl-4-piperidinyl)imino]-1,6-hexanediyl[(2,2,6,6-tetramethyl-4-piper-idinyl)imino]]) and CHIMASSORB™ 2020 from BASF (N,N'-bis(2,2,6,6-tetramethyl-4-piperidinyl)-1,6-hexanediamine polymer with 2,4,6-trichloro-1,3,5-triazine reaction products with N-butyl-1-butanamine and N-butyl-2,2,6,6-tetramethyl-4-piperidinamine) are high molecular weight solid hindered amine light stabilizers (HALS). Since these do not dissolve in dicumyl peroxide (Dicup) at 60° C., these are not introduced to the pellets by the soaking method.

Figure 4:
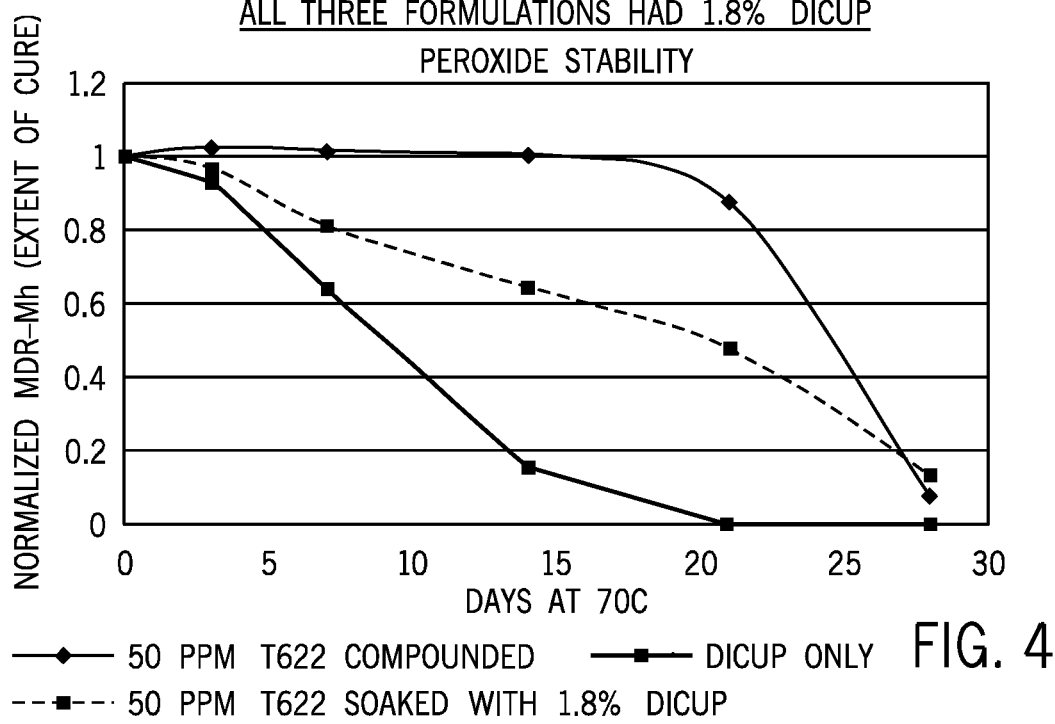
FIG. 4 is graph reporting a comparison of peroxide stability in LDPE between a sample compounded with TINUVIN™ 622 and impregnated (soaked) with TINUVIN™ 622.

TINUVIN™ 622 from BASF (an oligomeric hindered amine; butanedioc acid, dimethylester, polymer with 4-hydroxy-2,2,6,6-tetramethyl-1-piperidine ethanol), a high molecular weight low melting HALS, though soluble in Dicup, is not very effective as a base (for buffering) when introduced via soaking. Control experiments are run where the same loading of TINUVIN™ 622 (0.005 wt %) is introduced via compounding in a single screw extruder at 200° C., and good buffering properties are observed. A good base provides stability to the peroxide and maintains the cure levels measured by MDR-Mh. Table 8 compares the MDR-Mh values over four weeks of aging at 70° C. for TINUVIN™ 622 introduced via compounding and soaking. FIG. 4 presents this cure retention data by normalizing the MDR-Mh values of an aged sample with its day zero (initial) MDR-Mh. Table 8 and FIG. 4 clearly indicate that TINUVIN™ 622 when introduced via soaking, leads to loss in cure faster than when introduced via compounding. Hence, surprisingly, low molecular weight bases are required for soaking to be effective and enable one to circumvent the screen build up encountered with prior art high molecular weight high melting HALS.

TABLE 8

Comparative Examples MDR-Mh Values of TINUVIN™ 622 Introduced in Baseline Formulation 1 by Soaking with Dicup and Compounding All Formulations had 1.8% Dicup. Samples aged at 70° C.

| | MDR-Mh @ 182 C. after t days of aging at 70 C. | | | | | |
|---|---|---|---|---|---|---|
| | t = 0 day | t = 3 day | t = 7 day | t = 13 day | t = 21 day | t = 28 day |
| TINUVIN 622 compounded in baseline formulation 1 | 2.61 | 2.67 | 2.64 | 2.61 | 2.28 | 0.20 |
| Tinuvin 622 soaked in baseline formulation 1 | 2.71 | 2.61 | 2.19 | 1.74 | 1.30 | 0.00 |
| Baseline formulation 1 | 2.66 | 2.47 | 1.70 | 0.41 | 0.00 | 0.00 |

A base is considered effective in maintaining the storage stability of peroxide if there is more than 90% retention in cure (retention of initial Mh) after two weeks of aging at 70° C. Based on this criterion, the tabulated performance of TINUVIN™ 622 soaked (fail) and compounded (pass) in Table 9.

TABLE 9

Comparative Examples. Effectiveness of TINUVIN™ 622 as Base When Introduced by Soaking and Compounding. Day 14 Values are Calculated by Interpolating between Day 13 and Day 21.

| | MDR-Mh @ 182 C. after t days of aging at 70 C. | | % Mh retention at 14 days | Peroxide storage stability |
|---|---|---|---|---|
| | t = 0 days | t = 13 day | | |
| Tinuvin 622 compounded in baseline formulation 1 | 2.61 | 2.61 | 98% | Pass |
| Tinuvin 622 soaked in baseline formulation 1 | 2.71 | 1.74 | 62% | Fail |
| Baseline formulation 1 | 2.66 | 0.41 | 13% | Fail |

The above results establish that high molecular weight bases do not provide effective peroxide storage stability via soaking. As discussed below and as is known in the art, although high molecular weight bases do provide peroxide storage stability when compounded prior to screening, this results in unacceptable screen fouling.

As demonstrated below in data from pilot scale experiments, introducing low molecular weight base via soaking (post extrusion) surprisingly gives significant reduction in screen build up in the extruder (compared to when high as well as low molecular weight bases are introduced by compounding), provides effective peroxide storage stability, and mitigates water generation post cure compared to soaked high molecular weight bases. Furthermore, when post-extrusion soaking of low molecular weight bases is implemented in the commercial plants, it surprisingly reduces the rate of pressure build up, thus allowing long run times for producing good yields of extra clean product.

Pilot plant experiments are run on a ZSK-30 twin screw extruder to simulate the screen build up in an actual production plant. Higher additive loadings (six times the baseline formulation 1 loadings: 1.37 wt % DSTDP+0.83 wt % CYANOX™ 1790) are used for these experiments to accelerate the screen build up. Experiments are run at 245° C. A stack of screens ranging from 23 μm opening to 200 μm opening is used. Post-extrusion, the screen packs are delaminated, polymer is removed by toluene wash, and build up is measured by immersing the 23 μm opening screen in water and weighing the water soluble extract. Table 10 shows the build up on the screens in terms of mg of water soluble extract for inventive (post-extrusion soaked lower molecular weight bases) and comparative (compounded) examples.

TABLE 10

Build up on the Screens Measured as Water-Soluble Extract in mg for Formulations Run in Pilot Plant on Twin Screw ZSK-30 Extruder

| Formulation | | mg of extract |
|---|---|---|
| Post Extrusion Soaked low mwt bases (inventive) | 1.37% DSTDP + 0.83% C1790 + 0.0344% TAC (TAC soaked post extrusion) | 0.15 |
| | 1.37% DSTDP + 0.83% C1790 + 0.0344% T765 (T765 soaked post extrusion) | 0.15 |
| Compounded bases (comparative) | 1.37% DSTDP + 0.83% C1790 + 0.0344% TAC compounded | 0.60 |
| | 1.37% DSTDP + 0.83% C1790 + 0.0344% T765 compounded | 0.50 |
| | 1.37% DSTDP + 0.83% C1790 + 0.0344% C3346 compounded | 1.10 |

Less screen build up correlates to longer run times in the production cycles and hence the higher yields of extra clean product for extra high voltage applications. As the screen starts to build up, the pressure builds up at the breaker plate until it reaches a level where it becomes inefficient to operate. Table 11 shows that when baseline formulation 1 and baseline formulation 2 (containing only DSTDP and CYANOX™ 1790 and no base) are run through the extruder in an actual plant there is no pressure rise. Base is added to these formulations post-extrusion by soaking. On the other hand, when similar formulations with high molecular weight bases (0.225 wt % DSTDP+0.137 wt % CYANOX™ 1790+ 0.0075 wt % CYASORB™ 3346), (0.225 wt % DSTDP+ 0.137 wt % CYANOX™ 1790+0.0075 wt % CHIMASSORB™ 2020) and (0.225 wt % DSTDP+0.137 wt % CYANOX™ 1790+0.0022 wt % CYASORB™ 3346) are run, the average rate of pressure rise was 0.7 bar/hour, 0.7 bar/hour, and 0.5 bar/hour, respectively. This clearly shows the advantage of the current inventive process.

TABLE 11

Rate of Pressure Rise for Compounded High Molecular Weight Bases (Comparative) and for No Base Present during Extrusion

| Example | Additive composition in peroxide crosslinkable polymer | Pressure rise during extrusion (bar/hr) |
|---|---|---|
| Inventive | 0.225% DSTDP + 0.137% C1790 (low molecular weight base added after extrusion) | 0.0 |
| Inventive | 0.200% DSTDP + 0.120% C1790 (low molecular weight base added after extrusion) | 0.0 |
| Comparative | 0.200% DSTDP + 0.120% Cyanox 1790 + 0.0022% high molecular weight base Cyasorb 3346 | 0.5 |
| Comparative | 0.225% DSTDP + 0.137% Cyanox 1790 + 0.0075% high molecular weight base Cyasorb 3346 | 0.7 |
| Comparative | 0.225% DSTDP + 0.137% Cyanox 1790 + 0.0075% high molecular weight base Chimassorb 2020 | 0.7 |

Additional surprising advantage of introducing the bases through soaking is the reduced heat history for the base, since apparently, based on the following data, extra heat history during compounding can negatively affect the properties of the formulation. Table 12 shows that electrical and buffering properties of TINUVIN™ 765 (a low molecular weight base) at the same loading are dramatically improved when introduced via soaking as compared to compounding. High temperature high stress dissipation factor and water generation post curing were significantly lower for the soaked TINUVIN™ 765 based formulation compared to the compounded version of the same formulation. Along with peroxide stability during storage, the bases also mitigate the undesirable water generation during cure. Water generation in the soaked TINUVIN™ 765 sample is much lower than that in the compounded version showing better buffering through soaking. The samples with DSTDP, Cyanox 1790 and no base are expected to give moisture values higher than all the entries in Table 12.

TABLE 12

Inventive and Comparative Examples. Comparison of Electrical (Dissipation Factor) and Buffering Properties of Triallyl Cyanurate (TAC) and TINUVIN ™ 765 Introduced in the Formulations by Soaking and Compounding

|  | Formulation | df @ 98 C. 20 kV/mm (%) | df @ 130 C. 20 kV/mm (%) | Peroxide stability, pass if in 14 days at 70 C., there is >90% retention of cure | Water generation in Karlfischer at 240 C. (ppm) |
| --- | --- | --- | --- | --- | --- |
| Inventive Example 1 | 0.20% DSTDP + 0.12% C1790 + 0.0050% TAC soaked | 0.029 | 0.128 | pass | 55 |
| Inventive Example 2 | 0.20% DSTDP + 0.12% C1790 + 0.0050% T765 soaked | 0.014 | 0.125 | pass | 39 |
| Comparatve Example 1 | 0.20% DSTDP + 0.12% C1790 + 0.0050% TAC compounded | 0.027 | 0.111 | pass | 49 |
| Comparatve Example 2 | 0.20% DSTDP + 0.12% C1790 + 0.0050% T765 compounded | 0.017 | 0.222 | pass | 219 |
| Comparatve Example 3 | 0.20% DSTDP + 0.12% C1790 + 0.0050% C3346 compounded | 0.023 | 0.094 | pass | 30 |

All formulations in Table 6 had 1.8% Dicup.

Use of TAC as a coagent for cure boosting is known in the art, however the loadings claimed in this invention are well below the cure boosting levels. Table 13 shows that there is no difference between the MDR-Mh values (cure levels) of Example 1 with 0.005 wt % soaked TAC and the control without any TAC. Both formulations had 1.8 wt % dicumyl peroxide. Thus, the use of TAC at these levels is not suggested by the art.

TABLE 13

Cure Levels (MDR-Mh at 182 C.) of Example 1 with 0.005 wt % Soaked TAC Compared to Same Formulation without TAC

| Formulation in LDPE | MDR-Mh (lb.-in.) |
| --- | --- |
| 0.20% DSTDP + 0.12% C1790 + 0.0050% soaked TAC | 2.65 |
| 0.20% DSTDP + 0.12% C1790 | 2.66 |

What is claimed is:

1. A peroxide-crosslinkable composition comprising:
   (A) from 95 wt % to 99.9 wt %, based on the weight of the composition, of a peroxide-crosslinkable polyethylene consisting of (i) ethylene and (ii) optionally, a $C_3$-$C_{12}$ α-olefin comonomer;
   (B) 0.0005 to 0.03 wt % of a low molecular weight, or low melting, or liquid nitrogenous base comprising a hindered amine stabilizer, the low molecular weight, or low melting, or liquid nitrogenous base having (i) a molecular weight equal to or less than 1,400 g/mol and (ii) a melting temperature equal to or less than 95° C., based on the weight of the composition;
   (C) one or more antioxidants (AO); and
   (D) optionally an organic peroxide.

2. The composition of claim 1 in which the low molecular weight, or low melting, or liquid nitrogenous base has a molecular weight equal to or less than 1,000 g/mol.

3. The composition of claim 1 in which the antioxidant comprises a hindered phenol.

4. The composition of claim 1 in which the antioxidant comprises a thioester.

5. The composition of claim 1 in which the antioxidant comprises a hindered phenol and a thioester.

6. The composition of claim 1 which the antioxidant comprises tetrakis[methylene(3,5-di-tert-butyl-4-hydroxy-hydro-cinnamate)]methane; 4,4'-thiobis-(3-methyl-6-t-butylphenol); and distearylthiodipropionate (DSTDP).

7. The composition of claim 1 in which the antioxidant comprises [1,3,5-tris(4-tert-butyl-3-hydroxy-2,6-dimethyl-benzyl)-1,3,5-triazine-2,4,6-(1H,3H,5H)-trione]; and distearylthiodipropionate (DSTDP).

8. The composition of claim 1 comprising from 0.5 wt % to 2.5 wt % of the organic peroxide.

9. A cable comprising a sheath comprising the composition of claim 1.

10. The composition of claim 1, wherein the peroxide-crosslinkable polyethylene is a very low density polyethylene having a density from 0.870 g/cc to 0.915 g/cc.

11. The composition of claim 1, wherein the peroxide-crosslinkable polyethylene is an ethylene homopolymer having a density from 0.910 g/cc to 0.930 g/cc.

* * * * *